UNITED STATES PATENT OFFICE.

ANTON GARICSAN, OF CHICAGO, ILLINOIS.

PROCESS OF MAKING A MEDICINAL COMPOUND.

957,204.

Specification of Letters Patent. Patented May 10, 1910.

No Drawing. Application filed February 7, 1910. Serial No. 542,610.

*To all whom it may concern:*

Be it known that I, ANTON GARICSAN, a citizen of the United States, residing at Pullman Station, Chicago, county of Cook, and State of Illinois, have invented a certain new and useful Process of Making a Medicinal Compound, of which the following is a specification.

My invention relates to medicinal compounds adapted for the treatment of tuberculosis or consumption and the method of preparing the same.

The invention consists in the medicinal compound hereinafter described and claimed and in the method of preparing the same.

To prepare the compound I first mix together one ounce of Iceland moss, one ounce of Irish moss, one ounce of European centaury, one ounce of mullen leaves, one ounce of marshmallow leaves, one ounce of horehound, and three quarts of beer. This mixture is boiled down to concentrate the same until the whole amounts to but one quart. I then add one quart of honey and again boil the mixture down to concentrate it into one quart. The compound is then ready for use and may be bottled for convenience in handling. If desired the compound may be strained before bottling but this is not material.

The dose consists of a tablespoonful of the compound three times a day for adults, children in proportion.

I claim—

1. The method of preparing a medicinal compound which consists in mixing together Iceland moss, Irish moss; European centaury, mullen leaves, marshmallow leaves, horehound, and beer; then boiling the mixture to concentrate it; then adding honey to the mixture; and then boiling to further concentrate the mixture, substantially as described.

2. The method of preparing a medicinal compound which consists in mixing together one ounce of Iceland moss, one ounce of Irish moss, one ounce of European centaury, one ounce of mullen leaves, one ounce of marshmallow leaves, one ounce of horehound, and three quarts of beer; then boiling this mixture to concentrate it into one quart; then adding one quart of honey; and then boiling the mixture down to concentrate it into one quart, substantially as described.

In testimony whereof I have signed my name to this specification in the presence of two subscribing witnesses.

ANTON GARICSAN.

Witnesses:
JANET E. HOGAN,
JOSHUA R. H. POTTS.